United States Patent
Defilippi

(10) Patent No.: US 6,623,772 B1
(45) Date of Patent: Sep. 23, 2003

(54) COMPOSITE COMESTIBLE PRODUCT

(75) Inventor: Aldo Defilippi, Diano D'Alba (IT)

(73) Assignee: Sorremartec S.A., Schoppach-Arlon (BE)

( * ) Notice: Subject to any disclaimer, the term of this patent is extended or adjusted under 35 U.S.C. 154(b) by 171 days.

(21) Appl. No.: 09/655,396

(22) Filed: Sep. 5, 2000

(30) Foreign Application Priority Data

Sep. 6, 1999 (EP) ............................................. 99830549

(51) Int. Cl.$^7$ ................................................. A23G 3/00
(52) U.S. Cl. ........................ 426/103; 426/660; 424/440
(58) Field of Search ............... 426/660, 103; 424/440

(56) References Cited

U.S. PATENT DOCUMENTS

| | | | | |
|---|---|---|---|---|
| 4,289,790 A | * | 9/1981 | Bruelle ......................... | 426/93 |
| 4,372,942 A | * | 2/1983 | Cimiluca ...................... | 424/16 |
| 4,466,983 A | * | 8/1984 | Cifrese et al. ................. | 426/5 |
| 4,911,937 A | * | 3/1990 | Crosello et al. ............. | 426/103 |
| 5,985,341 A | * | 11/1999 | Ahalschwede ............... | 426/93 |
| 6,083,527 A | * | 7/2000 | Thistle ........................ | 424/440 |
| 6,372,271 B1 | * | 4/2002 | Fritzsching et al. ........ | 426/103 |
| 6,432,441 B1 | * | 8/2002 | Bealin-Kelly et al. ...... | 424/440 |
| 6,447,821 B1 | * | 9/2002 | Hakamata et al. ............ | 426/5 |

FOREIGN PATENT DOCUMENTS

| | | |
|---|---|---|
| DE | 8125667 | 2/1982 |
| EP | 0940084 | 9/1999 |
| FR | 2751846 | 2/1998 |
| WO | 9719602 | 6/1997 |
| WO | 9826668 | 6/1998 |

OTHER PUBLICATIONS

Product Know–How: "Süsswaren—Schokoküsse", 'Online! XP002133257'; Retrieved from Internet: <www.lebensmittelpraxis.de/know–how/warenkunde/schokokuesse/main.html>. Retrieved on Mar. 16, 2000.

* cited by examiner

Primary Examiner—Nina Bhat
(74) Attorney, Agent, or Firm—Rothwell, Figg, Ernst & Manbeck, P.C.

(57) ABSTRACT

A composite comestible product, such as a product for freshening the breath, includes an assembly to be eaten as a whole. The assembly includes a first part with respective first taste-giving agents, which can be attacked once placed in the consumer's mouth, thereby releasing the first taste-giving agents and a second part, connected to the first part and including second taste-giving agents, the second part also being attackable when placed in the consumer's mouth, thereby releasing the second taste-giving agents. The first and the second parts define together a receiving chamber for containing a third part of the product which includes respective third taste-giving agents.

17 Claims, 2 Drawing Sheets

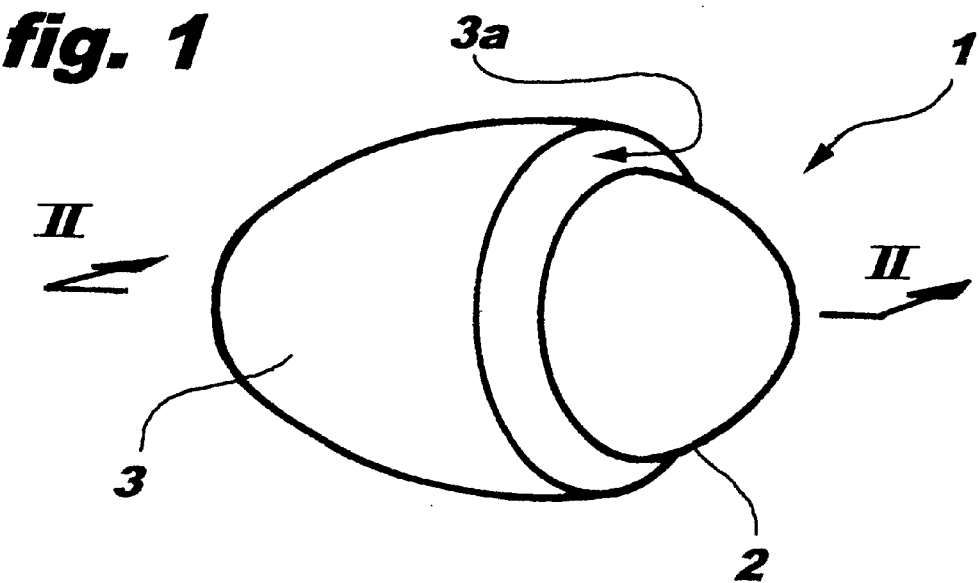
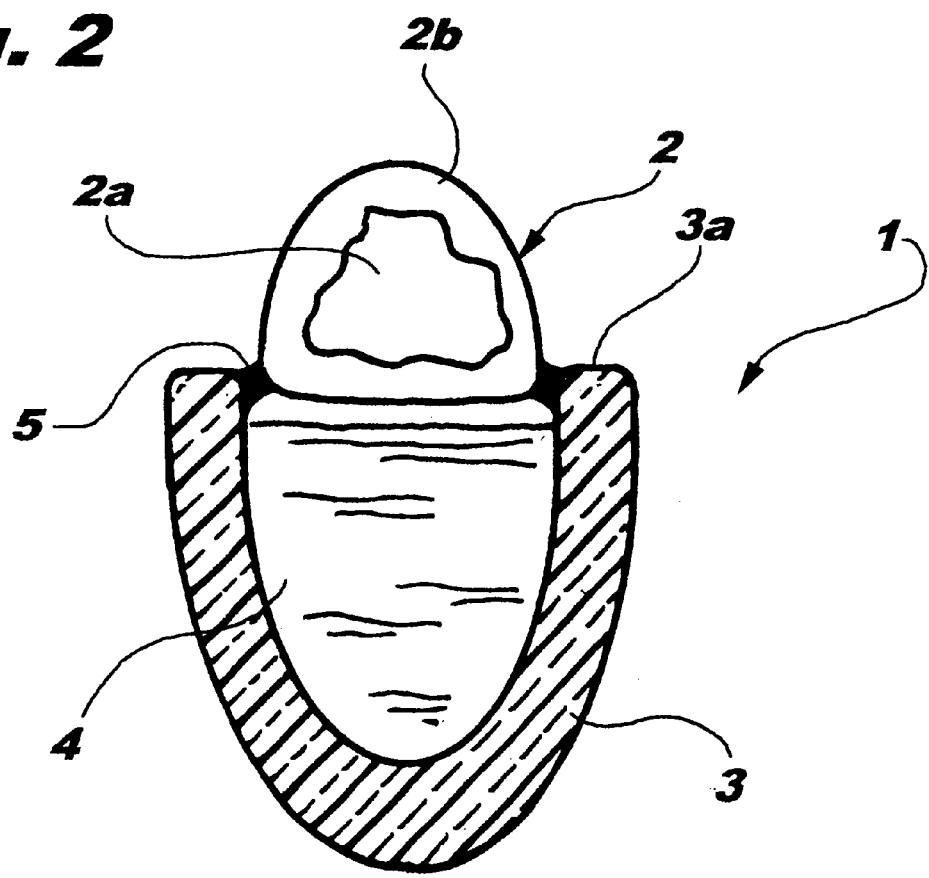

COMPOSITE COMESTIBLE PRODUCT

The present invention relates to composite comestible products of the type used, for example, for freshening the breath.

In the field of breath-freshening products (although the invention is not limited to this specific domain of use) composite products are commonly used which include a solid, paste, creamy, gelatinous or liquid-based, for example a sugar syrup, core covered in a shell, for example, of sugar or of a similar compact mass.

A typical example of such a product is the breath-freshening product sold under the brand name TIC TAC by companies of the Ferrero group. This product is constituted by a liquorice core covered with a sugar shell by means of a tumbler-coating process.

The usual manner of eating a product of this type ensures that once it is placed in the mouth, the outer coating is attacked by saliva, thereby dissolving within a certain lapse of time and releasing the flavour-carrying agents inside the mouth. Once the shell is consumed, the user consumes the core in substantially the same way, this also dissolving under the effect of saliva and releasing the respective taste-giving agents. Naturally, this manner of consumption is altered if, instead of allowing the product to dissolve in the mouth, the user chews it, thereby fragmenting it and mixing together the shell and the core which thus release their respective taste-giving agents virtually simultaneously, although this is affected by their respective characteristics (softness or compactness of the component, nature and relative strength of the taste-giving agents, etc.).

This phenomenon has already been analysed in European patent application 0 940 084 (used as the model for the preamble of claim 1 and forming part of the prior art solely by virtue of EPC Article 54.3) which pointed out that, in order to give the taste of a product, or of a component thereof, a degree of persistence once it was placed in the mouth, thus enabling the breath-freshening effect to last some time (in the case of products specifically intended for this purpose), it is necessary to give the product a special consistency. This in order to ensure that the taste-giving agents are released slowly, lasting while the product is "sucked", that is while the mass of the product is consumed, attacked and softened by saliva. To this end, it was observed that when this arrangement was adopted the organoleptic effect of the product was generally not immediate: in practice, in order for the product to develop the desired refreshing action and full taste, it is necessary to wait some time, which induces a tendency in the consumer to accelerate this effect by chewing the product, with possible negative consequences. A hard product can offer considerable resistance to chewing, which can prove unpleasant or, in the case of consumers with sensitive teeth, even damaging. In addition, by fragmenting the product, chewing increases the effect of saliva on it: as a result the product is consumed faster and the delivery of taste lasts less than it would if the product were simply sucked.

In order to make it possible for a product of the type specified above to provide a rapid freshening effect as soon as the product is placed in the mouth while ensuring, at the same time, that this effect proves long-lasting, the arrangement according to the aforesaid earlier European patent application proposes the manufacture of a composite food product which includes, in an assembly to be eaten as a whole:

- a first part, usually constituted by at least one sweet comprising a shell surrounding a generally soft core, this part being able to release its respective taste-giving agents as soon as it comes into contact with saliva in the mouth, and
- a second part, usually constituted by a pastille or tablet constituted by a compact mass of sugar or similar comestible product, which includes second taste-giving agents which once in the mouth are released over time.

The object of the present invention is to develop further the mechanism for controlling the gradual release of the various taste-giving agents, which formed the basis of this previous European patent application. This, both in relation to comestible products such as food products, not necessarily confectionery (in addition to the products for freshening the breath referred to above, one could mention, for example, savoury snack products and the like), and in relation to comestible products for medicinal or other therapeutic use. In particular, this additional field of application might be affected by a problem linked to the fact that one or more components having a pharmacological effect might incorporate, or themselves constitute agents providing an unpleasant taste (or "aftertaste") such as, for example, bitterness or a sensation of dryness, which could be advantageously masked, or at least countered, by the controlled release of another taste-giving agent.

This object is achieved according to the invention by providing a composite comestible product having the characteristics specifically claimed in the Claims which follow.

The invention will now be described, purely by way of non-limitative example, with reference to the appended drawings, in which:

BRIEF DESCRIPTION OF THE DRAWINGS

FIG. 1 illustrates a possible embodiment of a comestible product according to the invention, FIG. 2 is a section taken on the line II—II of FIG. 1, shown rotated through 90°, and FIGS. 3 to 7 schematically illustrate successive phases in the consumption of product according to the invention.

Figure 3:
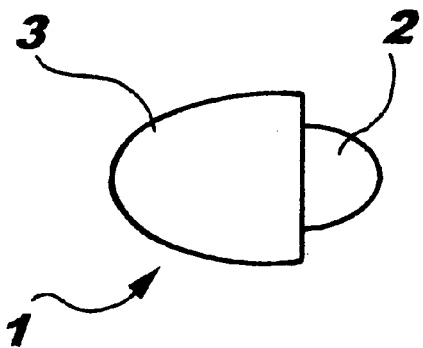

In the drawings, a comestible product is generally indicated 1 and constituted, in the embodiment illustrated, by a confectionery product substantially the same as a dragée or pill with a breath-freshening effect.

In the embodiment illustrated here, which is currently preferred, the product 1 is essentially made up of:

- a core 2 constituted by an inner core 2a enclosed in a shell 2b,
- a body 3 with the overall shape of a cup or beaker, for receiving the core 2 at its mouth in the manner of a stopper thereby defining a receiving chamber, and
- a comestible mass 4 inserted into the said receiving chamber.

The described assembly of parts constitutes a "single edible unit" since it is able to be placed in the mouth all together, in the usual manner of a tablet or pill. It should be remembered here that the term "comestible" has been used here so as to include in the scope of the invention not only food products in the usual sense but also, for example, pharmaceutical or other therapeutic products.

In short, the present invention is based on the fact that the first part 2, the second part 3 and the food substance 4 may all comprise respective taste-giving agents.

In particular, the taste-giving agents associated with the first part or core 2 are released when the said first part 2 is attacked by saliva, usually as a result of the shell 2b being consumed, thus giving access to the taste-giving agents contained in the inner core 2a. That said, it is possible to include respective taste-giving agents only or also in the shell 2b, and these may be different from those associated with the inner core 2a.

The taste-giving agents combined with the body 3 are usually released as a result of the body 3 itself being gradually consumed by saliva.

Finally, the taste-giving agents associated with the substance 4 are released when the respective chamber is made accessible from outside the product. Preferably (though not invariably, as will be better appreciated later), this occurs when the first part 2, which acts as a stopper, is separated from the body 3. This can be achieved either by means of mechanical action on the part of the consumer (using the tongue, for example) or simply as a result of saliva consuming an edible adhesive (a sugar, for example) which was holding the part 2 attached to the part 3.

It is clear that the decision to speak of the taste-giving agents associated with the part 2, the part 3 and the substance 4 in this order was dictated exclusively by the need to represent the structure of the product 1 in an orderly manner and has no reference to the sequence of the release over a period of time of the various agents in question: in fact, as it will be seen later, the currently preferred embodiment of the invention has the taste-giving agents combined with the substance 4 released when the product is placed in the mouth, ahead of the other agents with this function.

With regard to the term "taste-giving agents", it should be pointed out once again that this phrase could also cover characteristics of taste or aroma that were not expressly wanted or desired (being the effect, for example, of the addition of a flavouring agent). Such characteristics may also be intrinsic to a substance making up one or more parts of the product, with the additional possibility (for example in the case of products with a pharmaceutical or therapeutic effect) that the taste-giving effect of a particular agent might in fact be one that is intended to be masked or countered by other taste-giving agents.

In order to complete the picture it should also be pointed out that—although this arrangement is not explicitly illustrated in the drawings or considered in the remaining pages of this description—the product 1 shown in FIGS. 1 and 2 could also be covered again in a coating shell or layer (for example a layer of sugary material sprayed or coated onto the product 1) with yet further respective taste-giving agents, intended to be the first noticed by the consumer when the product is placed in the mouth.

As stated earlier, the part 2 is preferably formed in the shape of a dragée constituted essentially by:

a relatively soft inner core 2a, having a consistency ranging from a more or less viscous liquid to a gelatinous, creamy or paste mass or to a substantially solid or compact mass such as, for example, one obtained by compacting a powder, and a shell 2b enclosing the inner core 2a which is sufficiently compact so as to give the part 2 the necessary characteristics of mechanical strength, preventing it from being deformed or broken before being eaten.

In the embodiment illustrated the part 2 is shown as a body with an overall dome shape (for reasons which will become clearer later).

A dragée (or pill) constituting a part 2 having the aforesaid characteristics can be made, for example, by first forming the core 2a (by known methods) as a tablet of powder material. The core 2a is then removed from the mould so as to be available for a tumbler-coating treatment which will form the shell 2b. The shell 2b is preferably constituted by a polysaccharide, such as saccharose.

In the embodiment which is currently preferred, the inner core 2a is made from a flavoured confectionery product which includes as sweeteners one or more crystalline sugar alcohols and possibly other sweeteners. The flavouring agent is preferably incorporated earlier into the sugar alcohol component of the confectionery product, the flavouring agent being incorporated into the sugar alcohol according to the process described in WO-A-98/10662.

Preferably, the flavouring agents used in the inner core 2a include, but are not limited to, peppermint, spearmint, cinnamon, lemon, orange, lime, grapefruit, strawberry, cherry and pineapple in the form of essences, or compounds such as wintergreen (methylsalicylate). These are, of course, only some of the possible examples, since the chemical nature of the flavouring agent did not prove critical in the said incorporation process.

Tests carried out by the Applicant showed that a choice of the type described makes it possible to achieve a noticeable improvement in flavour development. This improvement refers in particular to an organoleptic sensation of heightened flavour, perceived by the consumer when the product comes into contact with saliva on being placed in the mouth. This effect of heightened aroma is particularly evident when the flavour used has aromatic components which impart a sensation of freshness, such as mint flavours for example.

The part 2 can, of course, contain other conventional sugars, such as saccharose, glucose or possibly synthetic sweetening agents. The flavours it contains can have been introduced, entirely or only in part, by means of the flavoured sugar alcohol components, as described earlier. During manufacture, the flavoured sugar alcohol component or the mixture of sugar alcohols is preferably introduced as the last ingredient in the final stage of production of the finished product or of any intermediate products, in order to avoid, as far as possible, this component coming into contact with moisture or being exposed to high temperatures, which could cause an alteration in the physical structure of the component itself.

According to the currently preferred embodiment, during the manufacture of the part 2 a granular mixture is first formed by mixing together saccharose, maltodextrin, gum arabic and the polyalcohols, into which flavours have been previously incorporated as described earlier.

The granular mixture is formed into the desired shape (into a general dome shape as in the embodiment illustrated, for example), by means of appropriate compressing machines, thus producing the inner core 2a. This is then coated in a (flavoured or non-flavoured) polysaccharide solution. Typically, this is a saccharose with starch solution, in a tumbler wherein core 2a is spray-coated with small quantities of the sugar solution, to which further quantities of flavour can be added in a manner which is per se known. This produces the finished part 2, with a shell 2b, ready to be coupled to the body 3.

In the embodiment illustrated by way of example, the body 3 is constituted by a dragée or pill consisting of a compact mass of sugar or a similar food substance which is formed into a general beaker shape on the production line (generally in a moulding process) so it is able to accommodate the mass 4 inside itself. The mass 4 may advantageously be constituted, either fully or in part, by a crystalline sugar alcohol-based sweetener of a type referred to earlier with specific reference to the earlier Application WO-A-98/10662.

Since the flavouring effect of such an agent is generally fairly strong, the quantity incorporated into the mass 4 must be calculated so that the achieved flavouring effect is coordinated with the flavouring effect of the other portions of the product 1 and with the overall aims which are intended to be achieved.

In particular, the flavouring effect linked to the mass 4 can be adjusted by intervening in at least three different factors (singly or in a coordinated manner):

the dose of the said flavouring agent identified as a percentage (by weight, for example) of the total quantity of the mass 4, the quantity of mass 4 contained inside the body 3, and the shape of the body 3, and therefore the internal volume thereof, which contains the mass 4.

Since the crystalline sugar alcohol-based flavouring agent described earlier exerts a rather strong organoleptic effect, the use of a high quantity of it in the mass 4 and/or the total or almost total filling of the body 3 with this mass 4, constitute the preferred choice in the case of products 1 of small dimensions (in order to give some idea, without of course in any way intending to limit the scope of the invention, products having an axial dimension—vertical in the view of FIG. 2—of 10–15 mm).

In the case of products of larger dimensions (products, for example having the same shape but an axial length of around 20–25 mm), a blander dose may be advised, so as to avoid an overaggressive flavouring effect. Arrangements can, of course, also be envisaged (in the pharmaceutical field, for example) in which a massive dose is advisable as the flavouring effect of the mass 4 is intended to contrast with an unpleasant flavour incorporated in the part 2 and/or 3, thus masking or covering the aforesaid unpleasant flavour.

With regard to the flavouring of the body 3, it is possible to use flavourings having an identical, similar or possibly complementary taste to those of the other parts of the product.

In this respect, however, it must be repeated that the arrangement of the invention leaves extremely ample margins of freedom, taking into account the fact that, in the most flexible embodiment, it is possible to play around with the effects and/or the (synergic or antagonistic) interaction of at least four types of different flavouring agent, that is:

the flavouring agents incorporated in and/or associated with the inner core 2a of the part 2, the flavouring agents incorporated in and/or associated with the shell 2b of the part 2, the flavouring agents incorporated in and/or associated with the body 3, and the flavouring agents incorporated in and/or associated with the mass 4.

As stated earlier, the part 2 and the body 3 are preferably shaped in such a way that the part 2 can be fitted to close the mouth of the body 3 like a stopper.

In the embodiment which is currently preferred (and which is illustrated in the appended drawings) the body 3 is generally beaker shaped, with a mouth portion 3a which is generally annular, into which the part 2, which is domed, with a circular base, fits like a stopper. This may be simply as a result of mechanical interference (that is by insertion) or be the result of sticking with an edible adhesive, for example, such as a mixture based on sugar and gum arabic. This adhesive (which is applied in dots or as a continuous bead around the mouth portion 3a of the body 3, as schematically indicated 5 in FIG. 2) is preferably chosen with an initial low viscosity in order that it can be applied by pouring, so as to penetrate the gap between the rim of the base of the part 2 and the inner edge of the mouth portion 3a.

The quick drying of the adhesive achieves the required connection between the part 2 and the part 3. This connection may be facilitated and/or made more secure by forming the facing peripheral portions, that is the rim of the base of the part 2 and the inner rim of the mouth of the part 3 so as to be complementary (with a step, for example) so that they mate more easily.

In any case, tests carried out by the Applicant show that the conformations illustrated (that is without the provision of special shaping) enable the desired result to be achieved, even without the application of an adhesive 5.

It should also be noted that the appearance of the parts of the product 1 which can be viewed from outside in the configuration of the product as presented to the consumer (to wit, that shown in FIG. 1) may either be identical or different, the part 2 and the part 3 both being white, for example, or of contrasting colours (the part 2 being green, blue, red etc. and the part 3 being white, or vice versa).

As stated earlier, even if this arrangement is not specifically illustrated in the drawings, the product 1 could be coated in an additional layer, sugar-based, for example, in order, for example, to strengthen the connection between the parts 2 and 3 and/or to enable an additional flavouring agent to be added, which would be the first to be noticed on placing the product in the mouth, that is in the configuration of FIG. 3.

As soon as the product 1 is placed in the mouth, the consumer's saliva generally attacks first the connection between the part 2 and the body 3, acting to detach the part 2 from the body 3 and thereby releasing the mass 4 and the respective flavouring agents. The flavour is then rapidly diffused around the oral cavity, continuing the desired initial effect, that is the release of taste-giving agents.

Before this effect develops (should the product 1 have an overall outer coating, which is not illustrated) the saliva could attack an outer coating thereby releasing the taste-giving agents thereof before the release of the taste-giving agents associated with the mass 4.

Figure 4:
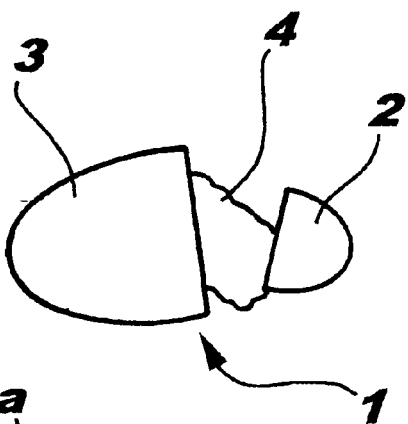

At a subsequent moment to the phase illustrated in FIG. 4, usually, that is while the organoleptic effect linked to the taste-giving agents of the mass 4 is still developing, though generally very strongly, the typical action resulting from sucking a sweet gets under way with the part 2.

The shell 2b thus gradually dissolves (releasing any related taste-giving agents) revealing the inner core 2a which then also releases its respective taste-giving agents (which may differ from those of the shell 2b).

Figure 5:
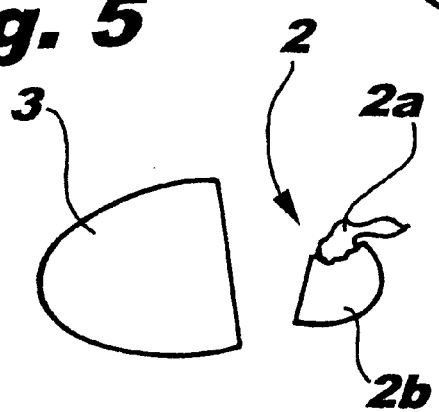

The product of the invention could also be "designed" in such a way that the phases of consumption schematically illustrated in FIGS. 4 and 5 occur in the opposite order to that identified in the sequence of the drawings.

In other words, it is possible to ensure (for example by providing a particularly secure connection 5) that the part 2 does not become separated from the body 3, thereby releasing the mass 4, until the shell 2b has been at least partly consumed, thereby releasing its flavouring agents and those of the inner core 2a.

Either result can be achieved, or at least encouraged, by acting on the relative conformation of the parts 2 and 3.

For example, in the embodiment illustrated, the part 2 constitutes a sort of stopper inserted into the mouth portion 3a of the body 3. The part 2 could be made, for example, as a lid, being generally cup-shaped and applied to the body 3 so that a peripheral rim thereof envelops and projects from the rim of the mouth 3a of the body 3: this would give the product 1 as a whole the general shape of a mushroom, with the body 3 constituting the stalk and the part 2 the head or cap. This relative conformation could make it more likely for the shell 2b to be at least partly consumed before the part 2 becomes detached from the body 3. However, the link between conformation and desired effect is not totally binding, in the sense that this alternative conformation of the part 2 can be adopted even in the case of wanting to maintain the sequence of phases shown in FIGS. 4 and 5, that is first the detachment of the part 2 from the body 3 and then the attack on and gradual consumption of the part 2.

Figure 6:
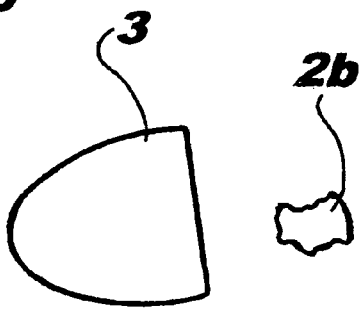
Figure 7:
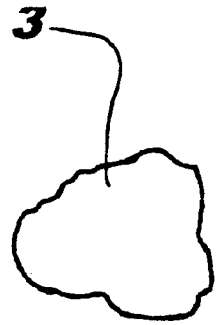

In the embodiment which is currently preferred, the body 3, constituted by a fairly compact mass, is intended to be the last portion of the product to be attacked by saliva, with the effect of gradually dissolving, once only a small portion remains of the part 2, typically of the shell 2b (see FIG. 6). The above demands that in the context of the overall organoleptic effect of the product, the body 3 plays the final role, and should last for quite some time.

This after-effect can prove advantageous when applied to products having a pharmacological or therapeutic effect for example, when the intention is to mask, with just such an after-effect, a not entirely pleasant "after-taste" (a bitterness or sense of dryness in the mouth and throat, for example) deriving from portions of the product consumed previously.

This does not alter the fact that, within the scope of the invention, it is possible to exchange the roles of the parts 2 and 3, making the body 3 not the last but the first portion of the product to be attacked by the saliva, possibly in order to cause the release of the mass 4 as a result of the rapid consumption of the body 3.

In addition to providing a high degree of freedom in the choice of possible flavouring agents (in the terms laid out earlier), the arrangement of the invention therefore also makes it possible to regulate precisely and effectively the sequence of release of these agents, by acting on a series of factors such as:

the fact that the separation of the parts 2 and 3 precedes (as in the case of the embodiment illustrated in the drawings) or follows any significant attack on either of the parts 2 or 3 by the saliva, and the fact that the body 3 is more compact, and thus more resistant, or less compact and thus less resistant than the part 2 to attack by the saliva (and possibly also the chewing).

Naturally, the principle of the invention remaining unchanged, manufacturing details and embodiments may be varied widely from those described and illustrated, without departing thereby from the scope of the present invention. This applies in particular and for example:

to the conformation of the parts 2 and 3: as already stated, while in the embodiment illustrated here the mouth portion 3a of the body 3 envelops the base of the part 2, the conformation could be complementary, with the part 2 enveloping the body 3 like the cap of a mushroom on a stalk; the parts 2 and 3, shown here as dissymmetrical, could be symmetrical and/or have conformations that are not different, being prismatic, tubular, etc.;

to the relative arrangement of the various elements: instead of being limited to the body 3, the cavity containing the substance 4 could extend into the part 2; while instead of projecting from the body 3, the part 2 could be totally or almost totally enclosed therein, and/or to the intrinsic characteristics of the various parts: for example, instead of being constituted by a single compact mass, the body 3 could in fact be constituted by several parts with different characteristics.

What is claimed is:

1. A composite comestible product comprising:

a first part including first taste-giving agents, said first part being adapted to dissolve in the mouth of a consumer to release said first taste-giving agents;

a second part including second taste-giving agents, said second part being adapted to dissolve in the mouth of the consumer to release said second taste-giving agents, wherein said first part and said second part are co-operatively connected to define a receiving chamber and are held together with at least one of an edible adhesive, which dissolves when the product is placed in the mouth of the consumer, or mechanical interference between said first and second parts; and a third part including third taste-giving agents, said third part being contained in said receiving chamber defined by said first and second parts, said first part and said second part being separable in the mouth of the consumer so as to open said receiving chamber to release said third taste-giving agents.

2. The product according to claim 1, wherein said first part is coupled to said second part in the manner of a stopper or lid, said first part being removable from said second part when the product is eaten or placed in the consumer's mouth.

3. The product according to claim 1, wherein said second part comprises a body being of the general shape of a beaker having a mouth portion and defining internally a portion of said receiving chamber for containing said third part, and said first part is positioned to close said mouth portion in the manner of a stopper or lid.

4. The product according claim 1, said first part comprising a dragée having a shell enveloping an inner core.

5. The product according to claim 4, wherein at least a portion of said first taste-giving agents are contained in said inner core.

6. The product according to claim 5, wherein at least a portion of said first taste-giving agents are contained in said shell.

7. The product-according to claim 6, wherein said first taste-giving agents of said inner core have a different flavour from said first taste-giving agents of said shell.

8. The product according to claim 4, wherein said shell comprises a polysaccharide.

9. The product according to claim 8, wherein said shell comprises saccharose.

10. The product according to claim 1, wherein said second part comprises a compact comestible mass.

11. The product according to claim 10, wherein said second part is sugar-based.

12. The product according to claim 1, wherein at least one of said first and second parts is dome-shaped.

13. The product according to claim 12, wherein said first part and said second part are both generally dome-shaped, said second part has a mouth portion and defines internally a portion of said receiving chamber for containing said third part, and said first part is fitted into the mouth portion of said second part.

14. The product according claim 1, wherein the taste-giving agent of at least one of said first part and said third part comprises one or more crystalline sugar alcohols in which the respective first or third taste-giving agents are incorporated.

15. The product according to claim 1, wherein said first and second parts are constructed and connected in such a way that when the product is placed in the consumer's mouth, said first and second parts separate to open said receiving chamber before either of said first or second parts dissolves, thereby releasing said third taste-giving agents before releasing said first and second taste-giving agents.

16. The product according to claim 1, wherein said first and second parts are constructed and connected in such a way that when the product is placed in the consumer's mouth, at least one of said first part and said second part dissolves before said first and second parts separate to open said receiving chamber, thereby releasing a respective one of said first and second taste-giving agents before said third taste-giving agent is released.

17. The product according to claim 1, wherein said first part is constructed so as to dissolve more quickly in the consumer's mouth than said second part, thereby releasing said first taste-giving agents before said second taste-giving agents.

\* \* \* \* \*

UNITED STATES PATENT AND TRADEMARK OFFICE
CERTIFICATE OF CORRECTION

PATENT NO. : 6,623,772 B1
DATED : September 23, 2003
INVENTOR(S) : Aldo Defilippi It is certified that error appears in the above-identified patent and that said Letters Patent is hereby corrected as shown below:

Title page,
Item [*] Notice, delete the phrase "by 171 days" and insert -- by 291 days --

Signed and Sealed this

Twenty-second Day of February, 2005

JON W. DUDAS
*Director of the United States Patent and Trademark Office*